United States Patent [19]

Brew

[11] Patent Number: 5,187,001
[45] Date of Patent: Feb. 16, 1993

[54] RESIN TRANSFER MOLDING APPARATUS

[75] Inventor: James K. Brew, Greenwood, Ind.

[73] Assignee: GenCorp Inc., Fairlawn, Ohio

[21] Appl. No.: 806,821

[22] Filed: Dec. 6, 1991

Related U.S. Application Data

[63] Continuation of Ser. No. 588,209, Sep. 26, 1990, abandoned.

[51] Int. Cl.$^5$ .............................................. B29C 45/77
[52] U.S. Cl. ..................................... 425/145; 264/37;
264/328.4; 264/328.6; 264/328.19; 425/147;
425/557
[58] Field of Search ............... 425/130, 145, 146, 147,
425/544, 557, 585, 150; 264/37, 82, 328.4,
328.6, 328.17, 328.19

[56] References Cited

U.S. PATENT DOCUMENTS

| | | | |
|---|---|---|---|
| 2,318,031 | 5/1943 | Tucker | 425/562 |
| 2,490,625 | 12/1949 | Hall | 425/543 |
| 2,862,239 | 12/1958 | Pollard et al. | 425/146 |
| 2,885,268 | 5/1959 | Breer et al. | 264/328.6 |
| 3,299,475 | 1/1967 | Carson et al. | 425/586 |
| 3,608,150 | 9/1971 | Laufer et al. | 425/568 |
| 3,723,037 | 3/1973 | Formo | 425/561 |
| 3,843,289 | 10/1974 | Taylor | 425/145 |
| 3,975,128 | 8/1976 | Schluter | 425/561 |
| 4,368,028 | 1/1983 | Grish et al. | 425/568 |
| 4,386,899 | 6/1983 | Cook | 425/568 |
| 4,443,177 | 4/1984 | Modur et al. | 425/568 |
| 4,611,893 | 9/1986 | Bielfeldt | 425/544 |
| 4,900,242 | 2/1990 | Maus et al. | 425/150 |

OTHER PUBLICATIONS

Webster's Ninth New Collegiate Dictionary 1986, p. 954.

Primary Examiner—Tim Heitbrink

[57] ABSTRACT

A resin transfer molding apparatus includes a single-shot metering pump which feeds a predetermined amount of resin material to the mold with a single stroke of the pump via an injector assembly which is mounted on the mold. A closed-loop hydraulic control of the metering pump enables the injection rate and pressure of the resin to be varied during the injection cycle to produce a more consistent fill of the mold and eliminate part waviness caused by pressure rise and fall. The mold-mounted injector assembly and placement of a plurality of valves in the apparatus enables recirculation of unused resin material back to the supply tank at a temperature sufficiently cool to prevent curing, so that solvent flushing of the apparatus can be eliminated in most cases. The apparatus is automatically controlled by a computer resulting in an integrated automatic apparatus. The attached injector assembly and valves also permit automatic switching between different resins by resin or solvent flushing of the lines of the apparatus, which eliminates draining and refilling the apparatus.

3 Claims, 5 Drawing Sheets

RESIN TRANSFER MOLDING APPARATUS

This application is a continuation of U.S. patent application Ser. No. 07/588,209, filed on Sep. 26, 1990, of James K. Brew, for Resin Transfer Molding Apparatus and Process, now abandoned.

FIELD OF THE INVENTION

The invention relates to resin transfer molding apparatus and processes, and in particular to a resin transfer molding apparatus and process for one- or two-part resin systems. More particularly, the invention relates to such a resin transfer molding apparatus which is automated and can switch between different resins without draining and refilling of the apparatus.

BACKGROUND ART

Closed mold processing is a plastic processing technique which has heretofore been utilized with consistent reproducibility to produce complex, high-strength shapes having a smooth finish on both sides. A typical closed mold apparatus utilizes a two-piece mold consisting of a female die or cavity and a male die or core. A composite of resin, reinforcement, fillers and additives is introduced between the matched dies which are heated and closed under pressure to cure the composite into a solid reinforced plastic part. There are four basic closed mold processes including compression molding, injection molding, stamping, and resin transfer molding.

Resin transfer molding, also commonly referred to as RTM, is a process that has heretofore been typically used in low to medium volume applications. However, recent improvements in resin chemistry are making the process cost-effective for higher volume applications. The reinforcement used in resin transfer molding typically is a mat reinforcement. The tooling used therein can be heated or non-heated, machined and matched metal molds, or warm matched plastics. When molding, the reinforcement typically is placed on the lower mold, the mold halves clamped together, and resin pumped into the molds under pressure. A compressible seal is built into the mold around the part periphery, with provisions for allowing air to escape while containing the resin.

Most known prior art resin transfer molding apparatus typically use a small metering pump, having a resin cylinder for one-part systems and separate resin and catalyst cylinders for two-part resin systems, to fill the mold through a hand-held static mixer that is placed adjacent to or is temporarily fastened to an injection port on the mold. The resin is pumped in by repeated stroking of the metering cylinders until a predetermined volume has been delivered into the mold. The static mixer then is withdrawn and flushed out. However, the above-described prior art method and apparatus has several disadvantages when compared to the apparatus and process of the present invention. First, the metering pump of the present invention is a single-shot metering pump having a closed-loop hydraulic control, which enables the injection rate and pressure of the resin to be profiled or varied during the injection cycle. This results in a more consistent fill of the mold over that obtained in prior art apparatus and methods, and eliminates part waviness caused by pressure rise and fall as a result of the repeated stroking of prior art devices. Moreover, under proper conditions, attachment of the injector assembly to the mold and placement of a plurality of valves in the apparatus enables unused material to be recirculated back to the resin supply tank, and further allows the entire apparatus to be automatically controlled by a computer resulting in an entirely automated system. If desired, a conventional industrial computer or central processing unit which can be used to automatically control the mold clamp or press, can be interfaced with the computer of the apparatus of the invention to further automate the manufacturing process for parts molded by the resin transfer molding method. In addition, the attached injector assembly and valves permit switching between different resins by automatic resin or solvent flushing of the lines of the apparatus, which eliminates draining and refilling of the entire apparatus, which is necessary with known prior art equipment.

U.S. Pat. No. 4,386,899 to Cook relates to a material injection assembly of the type for injecting a resin material into a mold cavity including a body member defining a nozzle for injecting material into a mold and including at least one central channel for conveying a first material through the nozzle. The assembly is characterized by an internal purging mechanism for closing the nozzle to the mold while allowing the flow of purging material between the channel supplying resin material to the control channel and a debris channel. The purging mechanism further allows flow of purging material between a separate purging material channel and the debris channel to perform a post-purge function.

U.S. Pat. No. 4,611,983 to Bielfeldt relates to an injection press for use in a transfer molding system for fiber reinforced thermosetting resins, comprising an injection piston, an injection cylinder in which the injection piston moves, a feed bore which traverses the injection cylinder, a sprue orifice which leads into the mold, a telescoping sleeve which serves to seal off the feed bore when the piston travels toward the sprue orifice, wherein the injection piston seals the transfer bore at the end of the stroke near the sprue orifice, and wherein said feed bore is open when the piston is in a position a stroke length away from the sprue orifice.

SUMMARY OF THE INVENTION

The invention relates to a resin transfer molding apparatus which includes a single-shot metering pump which feeds a predetermined amount of resin material to the mold with a single stroke of the pump via an injector assembly which is mounted on the mold. A closed-loop hydraulic control of the metering pump enables the injection rate and pressure of the resin to be varied during the injection cycle to produce a more consistent fill of the mold and eliminate part waviness caused by pressure rise and fall. The mold-mounted injector assembly and placement of a plurality of valves in the apparatus enables recirculation of unused resin material back to the supply tank at a temperature sufficiently cool to prevent curing, so that solvent flushing of the apparatus can be eliminated in most cases. The apparatus is automatically controlled by a computer resulting in an integrated automatic apparatus. The attached injector assembly and valves also permit automatic switching between different resins by resin or solvent flushing of the lines of the apparatus which eliminates draining and refilling of the apparatus.

DETAILED DESCRIPTION OF THE DRAWINGS

Similar numerals refer to similar parts throughout the drawings.

DETAILED DESCRIPTION

Figure 1:
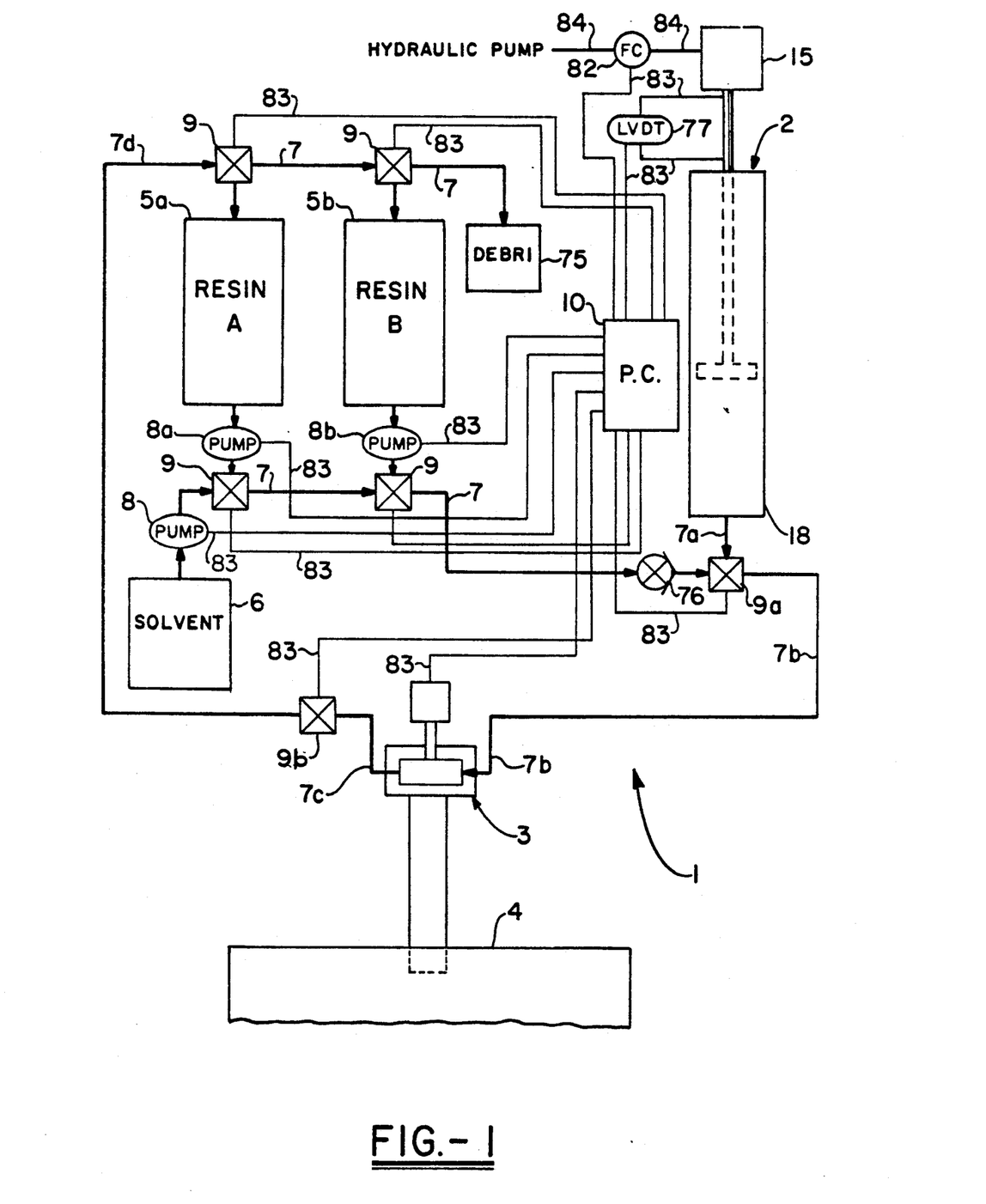
FIG. 1 is a schematic view of a first embodiment of the resin transfer molding apparatus of the present invention, for use with one-part resin systems.

The resin transfer molding apparatus of the present invention is utilized in forming resin composites such as thermosetting polyesters, vinyl esters and epoxies, which are useful in composite vehicle panels, hoods, etc. A first embodiment of the resin transfer molding apparatus of the present invention is shown in FIG. 1 and is indicated generally at 1. Apparatus 1 is adapted for use with one-part resin systems and includes a metering pump indicated generally at 2, an injector assembly indicated generally at 3 which is mounted on a usual closed mold 4, resin storage tanks 5a and 5b, a solvent storage tank 6, a plurality of conduits, pumps and valves referred to collectively as 7, 8 and 9, respectively, and a personal computer 10 for integrating and automatically controlling the entire apparatus.

Figure 2:
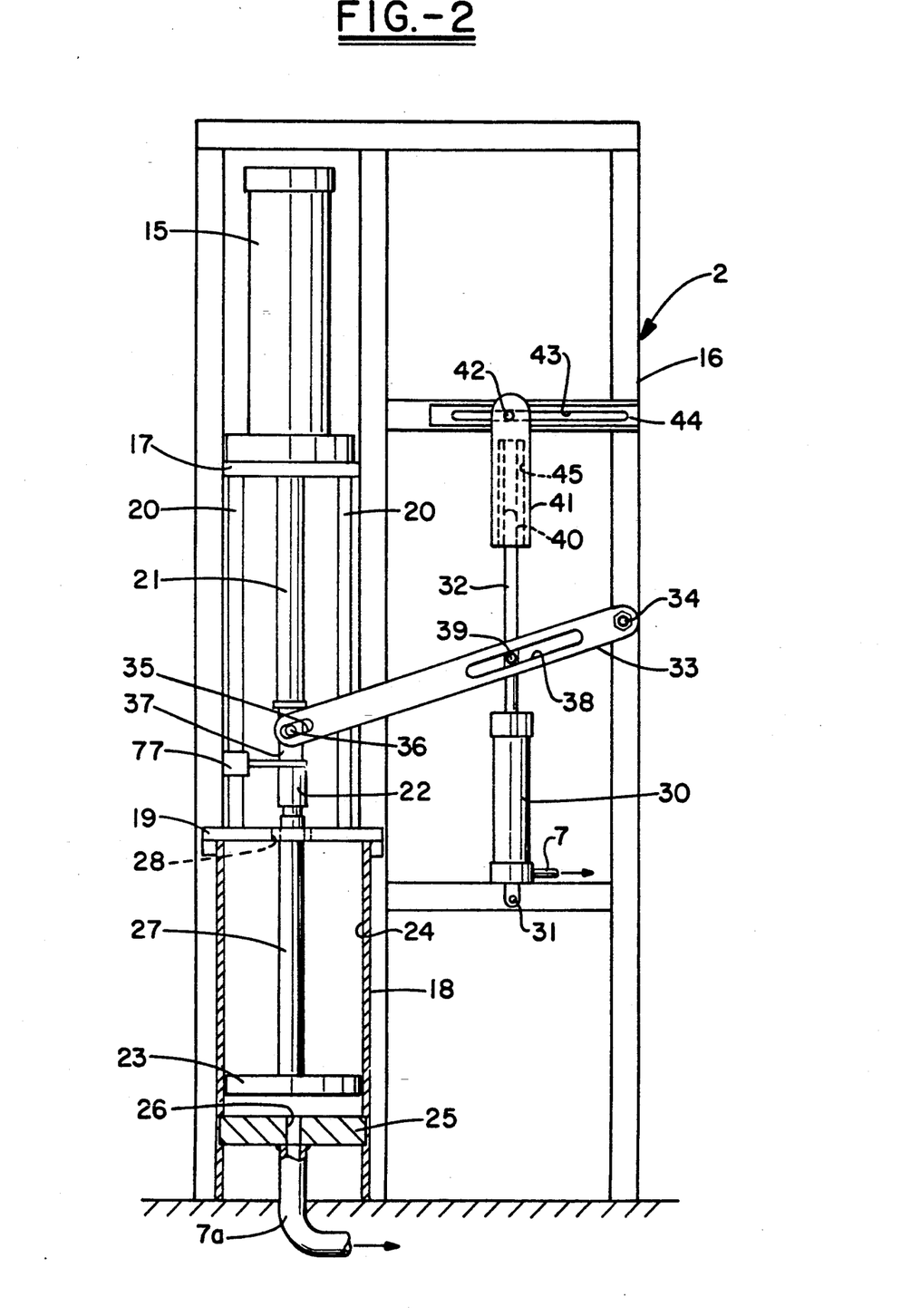
FIG. 2 is an elevational view, with portions in section, of the metering pump of the invention.

Metering pump 2 is best shown in FIG. 2 and includes a usual hydraulic cylinder 15 which is mounted within a support structure or housing 16 by a mounting plate 17. A resin material cylinder 18 likewise is mounted on support structure 16 by a mounting plate 19. Hydraulic cylinder 15 and resin material cylinder 18 are maintained in alignment by a pair of tie rods 20 which extend between and are attached to mounting plates 17 and 19. A rod 21 is slidably mounted in hydraulic cylinder 15, and a coupling 22 is attached to the lower end of rod 21 for attaching another rod 27 which passes through an opening 28 formed in mounting plate 19. Rod 27 is attached at its lower end to a piston 23 which is slidably mounted in bore 24 of resin material cylinder 18. A lower end plate 25 of material cylinder 18 is formed with an outlet opening 26, which communicates with conduit segment 7a of apparatus 1.

An optional catalyst-containing slave cylinder 30 is mounted on support structure 16 by any suitable fastening means 31 (FIG. 2). Catalyst cylinder 30 has an outlet opening (not shown) formed in its lower end which communicates with conduit 7 of apparatus 1. A rod 32 is slidably mounted in cylinder 30 and is attached at its lower end to a piston which in turn is slidably mounted within the bore of the cylinder (not shown). A tie rod 33 is pivotally mounted at one of its ends to support structure 16 by a shoulder bolt 34, and at its other end is formed with an opening 35 whereby the tie rod is movably connected to a stud 36 which is formed on and extends outwardly from a roller bearing 37 which is movably mounted on hydraulic cylinder rod 21. Tie rod 33 further is formed with an elongated opening 38 in an intermediate portion thereof, whereby rod 33 is movably connected to an outwardly extending stud 39 formed on catalyst cylinder rod 32. An upper end of catalyst cylinder rod 32 is slidably mounted in a bushing 40 which in turn is mounted in an opening 45 formed in a clevis bracket guide 41. An outwardly extending stud 42 is formed on clevis bracket guide 41 and is slidably engaged in an elongated slot 43 formed in an adjustment bar 44 which is utilized to adjust the ratio of resin output from material cylinder 18 to the catalyst output from slave cylinder 30. Metering pump 2 may be secured through support structure 16 to any stable surface for use in apparatus 1.

It is understood that the catalyst-containing slave cylinder 30 and the associated mechanism for driving cylinder 30 through hydraulic cylinder 15, is not necessary for a one-part resin system as shown in FIG. 1. However, it is desirable that metering pump 2 include catalyst slave cylinder 30 to provide the capability to apparatus 1 for switching between use with one-part resin systems, and two-part resin systems which are discussed in greater detail below in the description of the second embodiment of the present invention.

Figure 3:
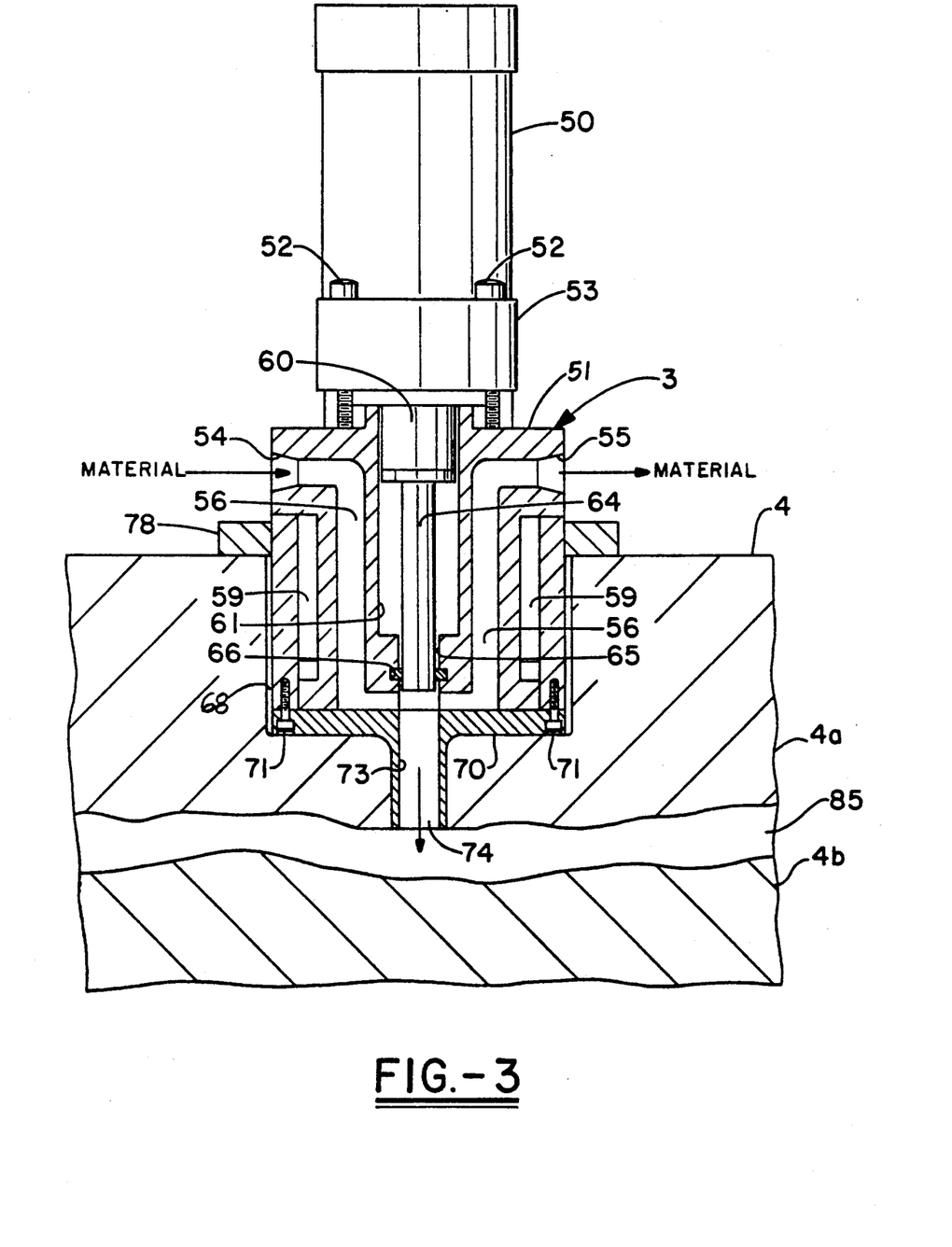
FIG. 3 is a partial longitudinal sectional view of the injector assembly taken through the material inlet and outlet ports of the assembly, shown mounted on a usual mold, and showing the injector pin in a fully retracted or open position.
Figure 4:
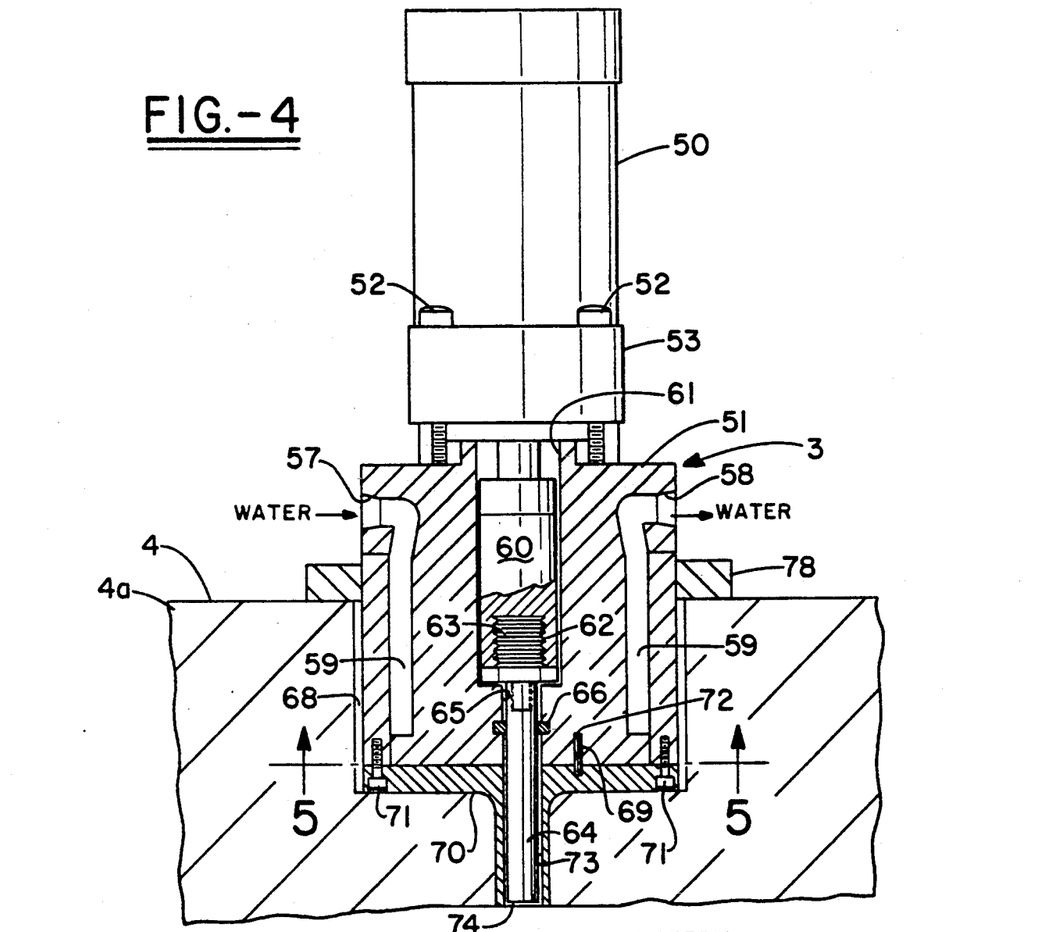
FIG. 4 is a partial longitudinal sectional view of the injector assembly taken through the water cooling inlet and outlet ports of the assembly, shown mounted on a usual mold, and showing the injector pin in a fully extended or closed position.
Figure 5:
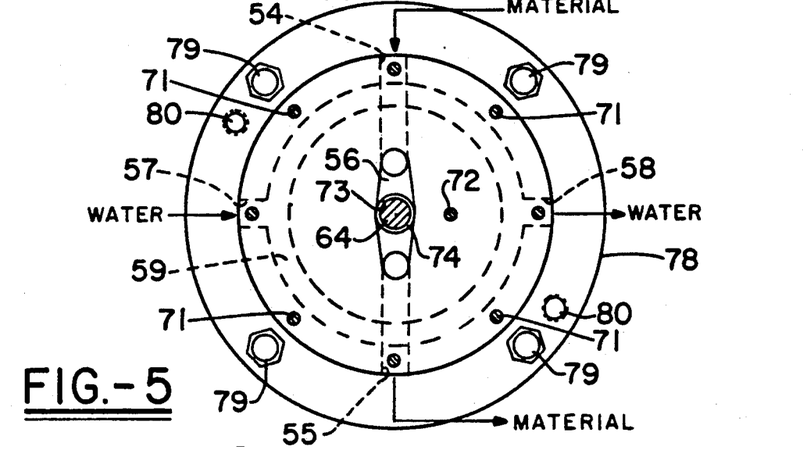
FIG. 5 is a section taken on line 5—5, FIG. 4, and particularly showing the relative locations of the material and water cooling inlet and outlet ports, the material conduit, and the water cooling jacket of the injector assembly.

Injector assembly 3 is shown in FIGS. 3 and 4 in two different orientations determined by the location of the longitudinal section taken through the assembly. More specifically, FIG. 3 is a section through material inlet and outlet openings of injector assembly 3 which are 180° apart as shown in FIG. 5, and FIG. 4 is a section through water inlet and outlet openings of injector assembly 3, which are 180° apart and offset 90° from the material openings as also shown in FIG. 5. Injector assembly 3 includes a usual hydraulic cylinder 50 which is attached to a body 51 of the assembly by four bolts 52 (only two of which are shown), which pass through four openings (not shown) formed in a flange 53 of hydraulic cylinder 50 and threadably engage body 51. Injector assembly body 51 is formed with a resin material inlet opening 54 and a resin material outlet opening 55, which communicate through a resin material conduit 56 (FIG. 3). Body 51 further is formed with a water inlet opening 57 and a water outlet opening 58, which communicate through a water cooling jacket 59 formed about the periphery of body 51 (FIG. 4). A rod 60 is slidably mounted in hydraulic cylinder 50 and extends into a bore 61 formed in injector assembly body 51. The lower end of rod 60 is formed with a threaded opening 62 (FIG. 4) for threadable engagement with a threaded upper end 63 of an injector pin 64. Injector pin 64 is adapted to reciprocate between a fully retracted or open position as shown in FIG. 3, and a fully extended or closed position as shown in FIG. 4, within a reduced diameter portion 65 of bore 61 having an O-ring seal 66 placed therein.

An injector nozzle 70 is mounted on the lower end of injector assembly body 51 by a plurality of bolts 71 (FIGS. 3-5). A locator pin 72 is attached to and extends outwardly from injector nozzle 70 and engages an opening 69 formed in body 51 to insure proper location of the nozzle on the body. Injector nozzle 70 is formed with a bore 73 which has a diameter similar to the diameter of injector pin 64. When pin 64 is in its fully extended or closed position, the lower end thereof is flush with an outlet opening 74 formed in the end of injector nozzle 70.

The above-described injector assembly 3 is removably mounted on mold 4 by a plurality of bolts 79 and jack screws 80 (FIG. 5) which pass through openings (not shown) formed in an annular flange 78 formed integrally with injector assembly body 51, and threadably engage an upper half 4a of mold 4 (FIG. 3) which is formed with a specially adapted recess 68 for receiving injector assembly 3. Jack screws 80 are utilized to enable injector assembly 3 to be more easily removed from upper mold half 4a should leakage of resin from the injector assembly occur, or from other occurrences which might cause the assembly to become difficult to dislodge from the mold.

In accordance with one of the main features of the present invention, and as best shown in FIG. 1, metering pump 2, injector assembly 3, resin storage tanks 5a and 5b, solvent storage tank 6, and a debris tank 75, all are interconnected by conduits 7 having valves 9 incorporated at critical locations throughout apparatus 1. Each valve 9 is a pneumatic valve of a type which is well known to the art and to the literature, and preferably is a pneumatic needle valve manufactured by Graco®, part no. 205-612. Resin storage tanks 5a and 5b and solvent storage tank 6 each have a pump 8 incorporated into conduit 7 adjacent to the outlet opening of the respective storage tanks for pumping the resin or solvent therefrom. Apparatus 1 further includes a conventional check valve 76 which is incorporated into conduit 7 between resin storage tank 5b and metering pump 2, for preventing backflow of the resin or solvent passing through conduit 7 and into the metering pump.

In accordance with another of the main features of the present invention, personal computer 10 is electrically connected to pumps 8, valves 9, injector assembly 3, and an encoder guide 77 or linear velocity displacement transducer (commonly referred to as LVDT) and flow control valve 82 of metering pump 2 through a plurality of electrical circuits referred to collectively as 83, to form an integrated, automatically controlled resin transfer molding apparatus. A closedloop hydraulic control of metering pump 2 is formed through hydraulic lines 84, flow control valve 82 and a hydraulic pump. It is understood that the processes of placing a reinforcement article in mold 4, and attendant opening and closing and clamping shut of the mold, may be achieved by a human operator or alternatively by a robot which could be interfaced with personal computer 10 through a conventional industrial computer or central processing unit to further automate the manufacturing process for parts molded by the resin transfer molding method, without affecting the overall concept of the present invention.

Apparatus is operated in the following manner to form a solid reinforced plastic part. A reinforcement fiber mat (not shown) is placed by a human operator or robot, as discussed above, in a lower half 4b (FIG. 3) of open mold 4. Mold 4 then is clamped in the closed position. A preferred fiber material utilized in the reinforcement mat is glass, although carbon and/or synthetic fibers either alone or in combination with glass fibers may be utilized. A selected resin A contained in resin storage tank 5a then is pumped by pump 8a through conduit 7 and into resin material cylinder 18 of metering pump 2. Polyesters are the preferred thermoset resin due to their unique mechanical, electrical and chemical-resistant properties and cost-effective performance. However, depending on the end use application and properties desired in the part to be manufactured, other resins such as vinyl esters and epoxies could be utilized. For example, vinyl esters and epoxies have better physical properties than polyesters. In addition, fillers such as calcium carbonate, mica, clay, talc, etc. may be blended with the selected resin to reduce the cost thereof, and/or to obtain special-performance requirements such as conductivity or flame-retardancy in the final manufactured part. Moreover, other additives such as glass spheres may be blended with the selected resin to obtain properties such as a lightweight end product and/or to act as a filler. It is understood that apparatus 1 is useful for molding resins or resin blends in the liquid state.

As the selected resin is pumped into resin material cylinder 18 of pump 2, when the cylinder is filled with a predetermined amount of resin material, the personal computer 10 causes valve 9a adjacent to pump 2 to open in such a way so that the pump conveys the resin material through conduit section 7b and to material inlet opening 54 of injector assembly 3. As the material is pumped into inlet opening 54 and through material conduit 56, pin 64 of injector assembly 3 is in the retracted or open position as shown in FIG. 3 to allow resin material to pass through bore 73 formed in injector nozzle 70, out of outlet opening 74 and into mold cavity 85 of mold 4. During the filling of mold 4 with the resin material in the above-described manner, computer 10 closes valve 9b to prevent the flow of resin material from conduit segment 7c to segment 7d. After mold 4 is filled, computer 10 causes pin 64 to move to the fully extended or closed position, as shown in FIG. 4. Water jacket 59 contains cool water to prevent unused portions of the one-part resin system remaining in injector assembly 3, from curing due to the heat radiated to the assembly 3 from mold 4, which has pressure and heat applied thereto to affect curing of the part contained in the mold. The unused resin may be recirculated through material conduit 56, out of material outlet 55, and back into storage tank 5a, by purging with additional resin from storage tank 5a to lower the likelihood that unused resin standing idle in injector assembly 3 will inadvertently cure.

If it is necessary to switch to a resin B contained in storage tank 5b, which is similar to the resin contained in storage tank 5a, during cure of the molded part contained in mold 4 and formed of resin A, the resin A material can be purged from the apparatus and into debris tank 75 by resin B, by computer 10 directing the appropriate opening and closing of valves 9. Alternatively, if the resin B is substantially different from resin A, it may first be necessary to flush the system with solvent from solvent storage tank 6, with debris being flushed out into debris tank 75. It is important to reiterate that resin recirculation, or resin or solvent purging when switching to a different resin, may be carried out while the thermosetting part in mold 4 is curing, so that when the curing within the mold is completed, apparatus 1 is ready to inject more material into mold 4 for forming another part.

It should be understood that the closed-loop hydraulic control of metering pump 2 as shown in FIG. 1 and previously described above, enables the injection rate and pressure of the selected resin to be profiled or varied during the injection cycle. This closed-loop hydraulic control causes a more consistent fill of the mold form and eliminates part waviness caused by pressure rise and fall as in prior art conventional apparatus which require repeated stroking of the metering pump to obtain fill of the mold. Moreover, attachment of injector assembly 3 to mold 4 and the placement of valves 9 in apparatus 1 enables the above-described recirculation of unused resin and replacement with fresh resin, or switching between resins by purging the old resin with the new resin or, in the case of substantially different resins, solvent flushing of the old resin and replacement with the new resin, all during cure of a part within mold 4. Thus, apparatus 1 effectively eliminates the need for draining and refilling such as occurred with prior art remote hand-held static mixer injector assemblies. The entire system is jacketed for water cooling to maintain constant temperature of material throughout the apparatus and to prevent premature curing of the thermosetting resin selected for a particular end use application. Moreover, the entire resin transfer molding apparatus is automatically controlled by an economical personal computer 10, which also can be interfaced with a conventional industrial computer or central processing unit which controls the opening, reinforcement mat placement, closing, clamping, heating, and pressure of mold 4, if desired, to further automate the manufacturing process.

Figure 6:
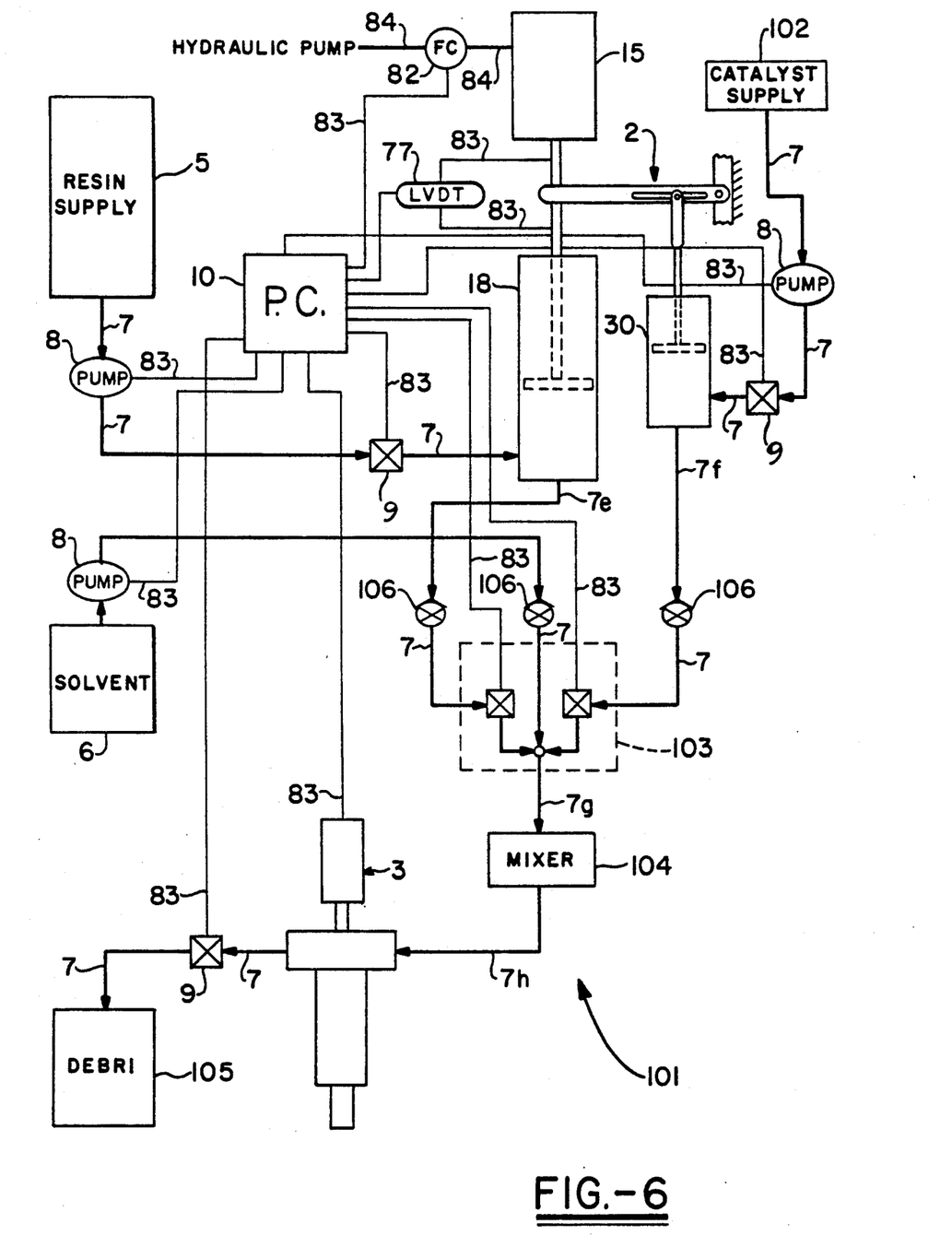
FIG. 6 is a schematic view of a second embodiment of the resin transfer molding apparatus of the present invention, for use with two-part resin systems.

A second embodiment of the resin transfer molding apparatus of the present invention is indicated generally at 101 and is shown in FIG. 6. Apparatus 101 is similar in many respects to apparatus 1 of the first embodiment of the present invention, with any differences therebetween being explained below, which differences are necessary for enabling use of the present invention with 2-part resin systems. However, such differences for accommodating the present invention for use with 2-part resin systems do not affect the overall concept of the present invention.

More particularly, apparatus 101 includes metering pump 2 and the optional catalyst-containing slave cylinder 30 and associated mechanism for driving cylinder 30. Apparatus 101 also includes a catalyst supply tank 102. Apparatus 101 further includes injector assembly 3 which is mounted on a mold (not shown), solvent storage tank 6, and a plurality of conduits, pumps, and valves 7, 8 and 9, respectively, as well as a personal computer 10 for integrating and automatically controlling the entire apparatus. The description of the above-referenced components for the first embodiment 1 of the present invention are hereby fully incorporated by reference herein for the description of the second embodiment 101 of the invention. A marrying block assembly 103 of a type which is well known to the art and the literature, is incorporated into conduits 7 leading from solvent tank 6, and resin material cylinder 18 and catalyst-containing cylinder 30 of metering pump 2. Marrying block assembly 103 brings together the selected resin material and complementary catalyst so that the resin and catalyst may be mixed in any suitable mixer 104 such as a static mixer prior to conveyance of the combined resin and catalyst into the mold via injector assembly 3. Apparatus 101 contains only a single resin supply tank 5, since the inclusion of additional resins and/or catalysts would complicate the structure and operation of apparatus 101, thereby decreasing the efficiency thereof. A debris tank 105 is positioned adjacent to a material outlet of injector assembly 3, since recirculation of resin and/or solvent is undesirable in apparatus 101 due to the chemical reaction of the catalyst and resin. That is, any unused resin material must be discarded. Personal computer 10 of apparatus 101 is electrically connected to pumps 8, valves 9, injector assembly 3, marrying block assembly 103, and encoder guide 77 and flow control valve 82 of metering pump 2 through a plurality of electrical circuits 83, to form an integrated, automatically controlled resin transfer molding apparatus. A closed-loop hydraulic control of metering pump 2 is formed through hydraulic lines 84, flow control valve 82, and a hydraulic pump. It is understood that the processes of placing a reinforcement article in the mold, and attendant opening and closing and clamping shut of the mold, may be achieved by a human operator or alternatively by a robot which could be interfaced with personal computer 10, through a conventional industrial computer or central processing unit to further automate the manufacturing process for parts molded by the resin transfer molding method, without affecting the overall concept of the present invention.

Apparatus 101 is operated in the following manner to form a solid reinforced plastic part. A reinforcement fiber mat (not shown) is placed by a human operator or a robot as discussed above in a lower half of the open mold (not shown). The mold then is clamped in the closed position. The preferred fiber material utilized in the reinforcement mat is glass, although carbon and/or synthetic fibers either alone or in combination with glass fibers may be utilized. A predetermined amount of the selected resin contained in resin storage tank 5 then is pumped by the pump 8 adjacent to resin supply tank 5 through conduit 7 and into resin material cylinder 18 of metering pump 2. The preferred thermoset resins, fillers, and additives described above with respect to apparatus 1 also are preferred for use in apparatus 101, and are hereby fully incorporated by reference.

The selected resin is pumped into resin material cylinder 18 of pump 2 simultaneously with the pumping of a predetermined amount of any suitable catalyst for use with the selected resin into slave cylinder 30 of pump 2. When the respective cylinders are filled with the predetermined amounts of resin material and catalyst, personal computer 10 causes hydraulic cylinder 15 to actuate and convey the resin and catalyst through conduit sections 7e and 7f and a plurality of check valves 106 which are incorporated into conduits 7 to prevent backflow of the resin and catalyst into metering pump 2, as well as the backflow of solvent into solvent tank 6 when solvent is utilized as discussed below. The resin and catalyst are brought together in a single conduit 7g by marrying block assembly 103, and the combined resin and catalyst then pass through mixer 104 and into the mold via injector assembly 3. During curing of the resin in the mold, injector pin 64 of injector assembly 3 is in the closed position (FIG. 4), and any reacting catalyst contained in conduit 7g, mixer 104, conduit section 7h, and injector assembly 3 can be flushed out with solvent from solvent tank 6 and into debris tank 105. It is understood that the closed-loop hydraulic control of metering pump 2 as shown in FIG. 6 and previously described above for apparatus 101, enables the injection rate and pressure of the selected resin to be profiled or varied during the injection cycle. The closed-loop hydraulic control causes a more consistent fill of the mold form and eliminates part waviness caused by pressure rise and fall as in prior art conventional apparatus which require repeated stroking of the metering pump to obtain fill of the mold. The attachment of injector assembly 3 to the mold and the placement of valves 9 in apparatus 101 enables the above-described flushing of apparatus 101 to be carried out during curing of a molded part, thus increasing the efficiency of the overall manufacturing process. In addition, the entire resin transfer molding apparatus is automatically controlled by personal computer 10, which also can be interfaced with a conventional industrial computer or central processing unit which controls the opening, reinforcement mat placement, closing, clamping, heating, and pressure of the mold, if desired to further automate the manufacturing process.

Thus, it can be seen that the resin transfer molding apparatus of the present invention can be utilized to form thermoset plastic composite parts useful in various end use applications such as automotive, heavy truck, and agricultural and off-road vehicle body panels. Again, the main features of the present invention include the single-shot metering pump having a closed-loop hydraulic control which enables the injection rate pressure of a resin to be profiled or varied during the injection cycle, which results in a more consistent fill of the mold and eliminates part waviness caused by pressure rise and fall. Another key feature of the present invention is the permanent attachment of the injector assembly to the mold, which enables the resin transfer molding apparatus to recirculate unused resin or switch between similar or substantially different resins either by purging the old resin with new resin, or when substantially different resins are going to be used, by flushing with a suitable solvent. The above operations can all be carried out simultaneously with curing of a plastic part in the mold, thus increasing the efficiency of the overall manufacturing process.

While in accordance with the Patent Statutes, the best modes and preferred embodiments have been set forth, the scope of the invention is not limited thereto, but rather by the scope of the attached claims.

What is claimed is:

1. A resin transfer molding apparatus comprising:
a) means for storing a flowable resin;
b) an injector assembly mounted on a mold, said injector assembly having a resin inlet and outlet, a resin conduit through which the inlet and outlet communicate, and means for regulating communication between the resin conduit and the mold;
c) a metering pump for pumping a predetermined amount of said resin into said mold via said injector assembly with a single stroke of said pump, said metering pump being located remote from said injector assembly;
d) means for conveying said resin from said resin storage means into said metering pump;
e) first conduit means for communication among said resin storage means, said resin conveying means, the resin inlet of said metering pump, and said injector assembly;
f) second conduit means for communication between the resin outlet of said injector assembly and said resin storage means;
g) a plurality of valves for regulating the flow of said resin within said conduit means; and
h) means for automatically controlling the operation of said injector assembly, said metering pump, said resin conveying means, and said valves, whereby unused portions of said resin can be recirculated back to said storage means during cure of said resin contained in said mold and replaced with a predetermined amount of said resin contained in said storage means, or whereby unused portions of said resin can be flushed from said apparatus during cure of said resin contained in said mold and replaced with a predetermined amount of said resin contained in said storage means.

2. The apparatus of claim 1, wherein said means for storing said resin is a storage tank; in which said resin conveying means is a resin conveying pump; in which said automatic control means is a personal computer electrically connected to said injector assembly, to a closed-loop hydraulic control and a linear velocity displacement transducer of said metering pump, to said resin conveying pump, and to said valves; in which said apparatus includes a solvent storage tank containing a solvent for flushing said first and second conduit means, said valves, and said injector assembly; and in which a solvent pump conveys said solvent through said first and second conduit means, said valves, and said injector assembly.

3. The apparatus of claim 2, wherein said apparatus includes a plurality of resin storage tanks which communicate via said conduit means, each of which contains a different resin, whereby unused portions of a first resin can be recirculated back to a first resin storage tank during cure of said first resin contained in said mold and replaced with a predetermined amount of a second resin contained in a second resin storage tank.

* * * * *